July 2, 1957 J. V. WEBSTER ET AL 2,797,542

ADJUSTABLE WHEELED SUPPORT AND HITCH FOR DISK HARROWS

Filed March 20, 1953 4 Sheets-Sheet 1

INVENTORS.
JOHN V. WEBSTER
BYRON T. AASLAND

BY Nathan N. Kraus & Frank H. Marks

ATTORNEYS

ADJUSTABLE WHEELED SUPPORT AND HITCH FOR DISK HARROWS

Filed March 20, 1953

4 Sheets-Sheet 2

INVENTORS.
JOHN V. WEBSTER
BYRON T. AASLAND

BY Nathan N. Kraus & Frank H. Marks

ATTORNEYS

INVENTORS.
JOHN V. WEBSTER
BYRON T. AASLAND
BY Nathan N. Kraus
Frank H. Marks
ATTORNEYS July 2, 1957 J. V. WEBSTER ET AL 2,797,542

ADJUSTABLE WHEELED SUPPORT AND HITCH FOR DISK HARROWS

Filed March 20, 1953 4 Sheets-Sheet 4

INVENTORS.
JOHN V. WEBSTER
BYRON T. AASLAND
BY Nathan N. Kraus & Frank H. Marks
ATTORNEYS

United States Patent Office 2,797,542

Patented July 2, 1957

2,797,542

ADJUSTABLE WHEELED SUPPORT AND HITCH FOR DISK HARROWS

John V. Webster and Byron T. Aasland, Kankakee, Ill., assignors to Sears, Roebuck and Co., Chicago, Ill., a corporation of New York Application March 20, 1953, Serial No. 343,606

2 Claims. (Cl. 55—73)

Our invention relates to improvements in disk harrows and more particularly to a wheel lift type disk harrow adapted to be drawn by a tractor.

One of the objects of our invention is the provision of a disk harrow having a single rigid harrow frame carrying a plurality of disk gangs relatively adjustable angularly and supported on a pair of depth regulating wheels in such a manner that the frame may be adjusted vertically with respect to the wheels so that the disk gangs may be maintained at any desired depth for which they may be set to operate.

Another object of our invention is the provision of a draft connection which permits adjustment and maintenance of the front and rear disk gangs at the same or different elevations relative to the ground.

A further object of our invention is the provision of manually operable means for regulating the height of the hitch or draft connection so that the same may be accommodated for connection to a tractor with a minimum of effort on the part of the operator.

A still further object of our invention is the provision of hydraulically or manually operated means for varying the depth of cut of the disk gangs and for raising the disk gangs out of operative position for transporting the harrow.

A still further object of our invention is the provision of a disk harrow of the foregoing type which is simple in construction, durable in service, and highly efficient in operation.

Other and further objects and advantages of our invention will become apparent from the following description when considered in connection with the accompanying drawings in which Fig. 1 is a top plan view of a disk harrow in accordance with our invention.

Figures 1, 7:
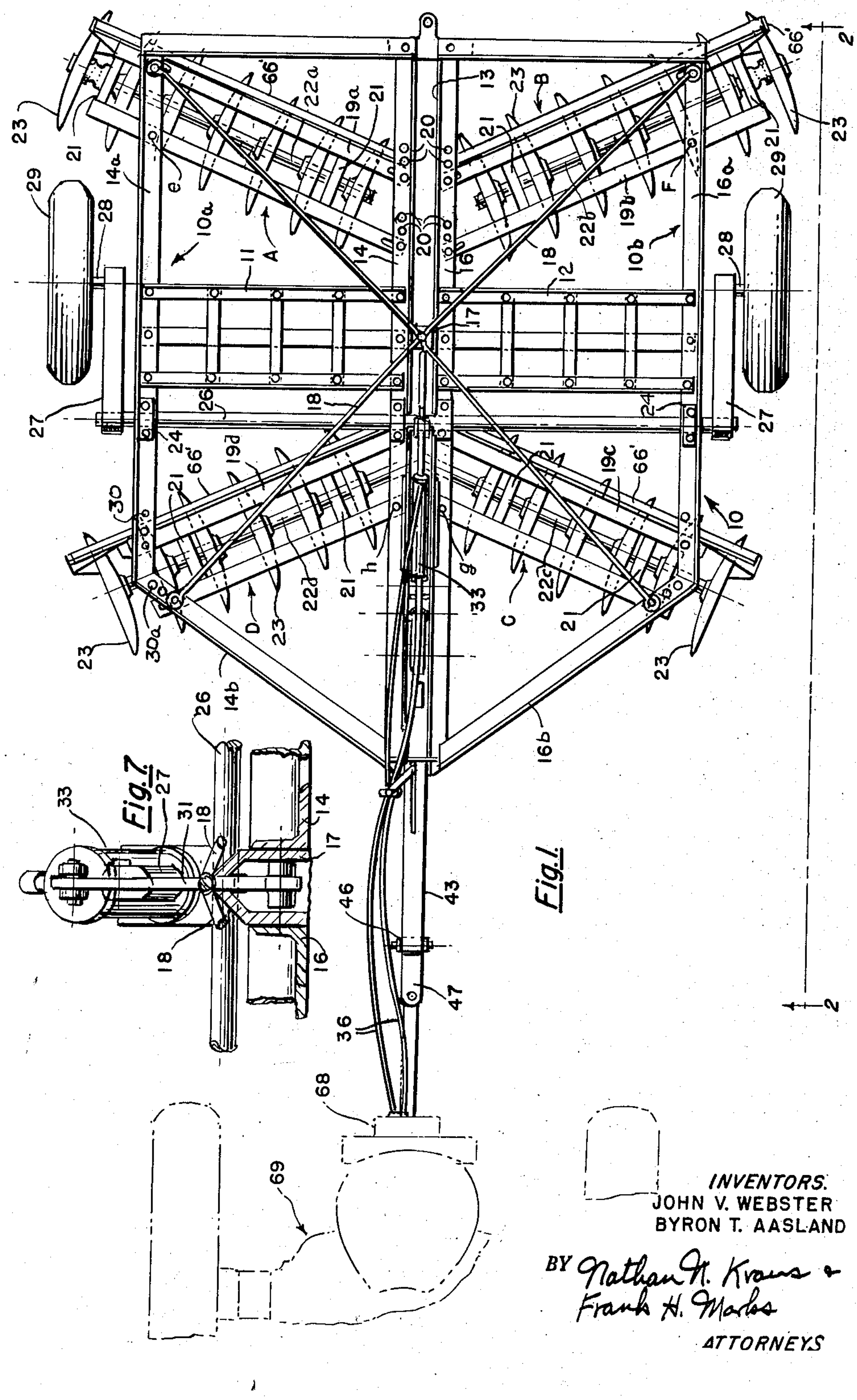
Fig. 7 is a cross sectional view on an enlarged scale taken substantially on line 7—7 of Fig. 5.

Referring to the drawings, particularly to Fig. 1, our invention comprises a main frame 10 formed of angle members which may be suitably joined together as by bolting, riveting and welding. The said frame includes right and left hand trapezoidal frame sections 10*a* and 10*b* each suitably braced by transverse truss frame members such as 11 and 12. The said sections are joined together at their forward and rearward ends to provide a central longitudinal opening 13, between frame members 14 and 16 and extending substantially throughout the length of the frame. A bridge member 17 is connected across the said frame members 14 and 16 and serves as an anchorage point for the ends of a plurality of brace rods 18, the opposite ends of which are connected to the frame sections 10*a* and 10*b*. The said rods may be provided with turnbuckles, not shown, for adjusting the tension of the rods.

Suitably secured to the underside of the main frame 10 as in the angular relations shown in Fig. 1 are four disk gangs A, B, C and D comprising frames 19*a*, *b*, *c* and *d*, from each of which depends a pair of spaced brackets 21 carrying suitable bearings for supporting the gang shafts 22*a*, *b*, *c* and *d*, on which are carried a plurality of disks 23 spaced as by spools 25. The disk gangs are so mounted on the main frame as to be independently adjustable angularly for various soil conditions. To that end the main frame members 14 and 16 at the rearward portions thereof are provided with two sets of holes 20 selectively arranged to register with slotted openings in the gang frames 19*a* and 19*b*. Thus the rear gang frames 19*a* and 19*b* may be swung about pivot points E and F, respectively, and secured in one of several positions of adjustment. Correspondingly, the main frame members 14*a*, 14*b*, 16*a*, 16*b* are provided with two sets of holes 30 and 30*a* arranged to register with slotted openings in the forward gang frames 19*c* and 19*d*, the said gang frames being arranged to swing about pivot points G and H respectively.

Arranged adjacent to each of the gang frames and secured to the main frame are angle members 66′ to which are adjustably attached in depending relation a plurality of disk scrapers each arranged to cooperate with a disk 23. The scrapers may be adjusted individually or as a gang in relation to the said disks.

Suitably mounted on the outer members 14*a* and 16*a* of the main frame 10 are bearing blocks 24 which support a transverse shaft 26 on each end of which is welded a crank arm 27. Each of the said crank arms carries a stub axle 28 for rotatably mounting a transport wheel 29. As will be hereinafter more fully explained, when the shaft 26 is rocked about its axis, the arms 27 are swung in vertical planes and the two wheels 29 are shifted simultaneously into or out of position to rest on the ground and support the main frame according to the direction in which the shaft 26 is rotated. A lever 31 rigidly fixed to the shaft 26 extends upwardly and has one end thereof pivotally connected to the piston rod 32 of a hydraulically operated jack cylinder 33. The said jack cylinder is pivotally connected to a bracket 34 which is attached to the frame members 14 and 16. The jack cylinder is connected by means of flexible conduits 36 to the hydraulic pump 68 associated with the tractor 69. Thus there is provided a closed hydraulic system for two-way action of the jack cylinder.

A transport link 37 for use when the harrow is in storage or otherwise disconnected from the tractor or when the hydraulic cylinder 33 which is considered a part of the tractor is removed therefrom, is pivotally connected at one end to the frame members 14 and 16. The opposite end 38 of the transport link 37 is bifurcated and is adapted to embrace the lever 31 so that when a pin 39 is passed therethrough, as illustrated, the wheels 29 are locked in transport position. It will be apparent that when the harrow is in operation the pin 39 is removed so as to effect disengagement between the transport link 37 and the lever 31.

At the forward end of the main frame are welded a pair of angle members 41 which in effect provide a yoke embracing opposite sides of a parallel hitch or draft connection indicated generally by the numeral 42. The hitch consists of upper and lower parallel bar members 43 and 44 pivotally connected at their forward ends to a member 46 to which are welded a pair of spaced pierced arms 47 forming an attaching clevis adapted to receive therebetween the draw bar of the tractor and to be connected thereto by a draft pin. Welded to the frame members 14 and 16 and depending therefrom is a pair of members 48 in spaced relation which are adapted to receive therebetween parallel members 43 and 44, said members being pivotally connected to the members 48 as by pins 49 and 51. As will be apparent the arms 47 are maintained in horizontal relation whatever the elevation of said arms may be above the ground surface.

Pivotally supported on the pin 49 is a lever 52 having bifurcated ends and pivotally mounted on the upper end thereof is a swivel block 50 which affords support for a crank 53, the shank of said crank being provided with a threaded portion which is in engagement with a swivel nut 45 pivotally supported in the lower parallel member 44. It will be apparent that rotation of the crank will effect movement of both upper and lower parallel members 43 and 44 and therewith the draft connection 47 within the limits illustrated by the solid and broken lines in Fig. 2.

Figure 2:
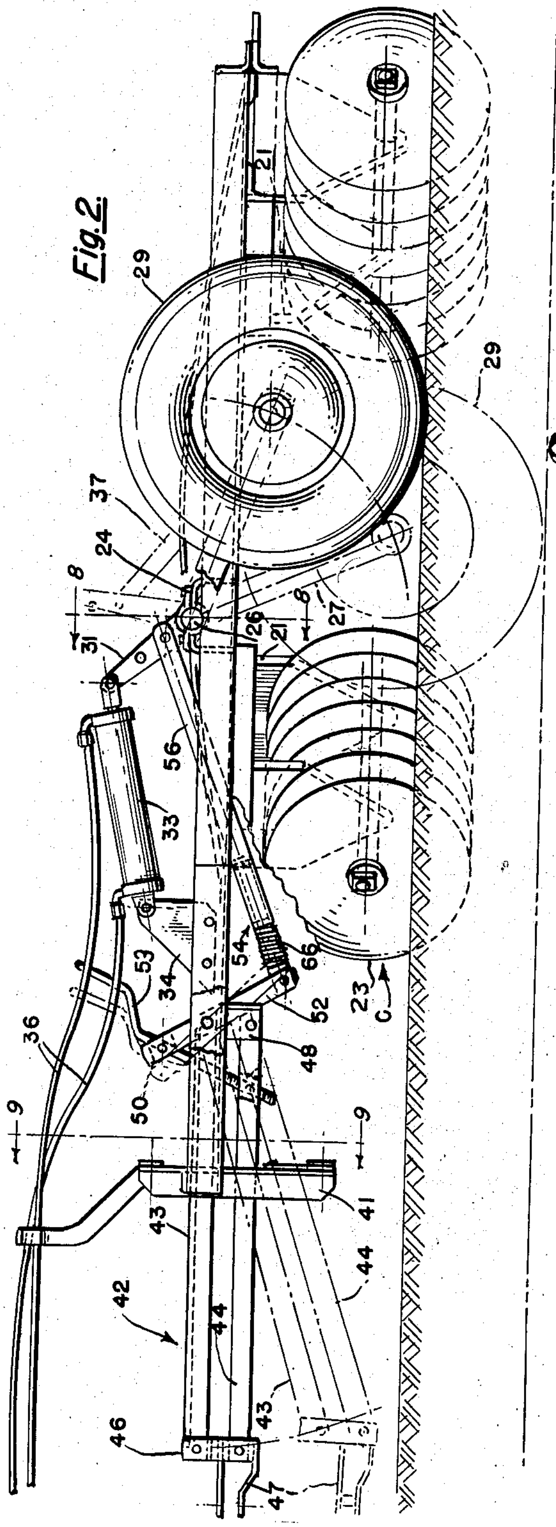
Fig. 2 is a side elevational view thereof, looking in the direction of the arrows 2—2 of Fig. 1 and showing the disk gangs in ground penetrating position.
Figure 8:
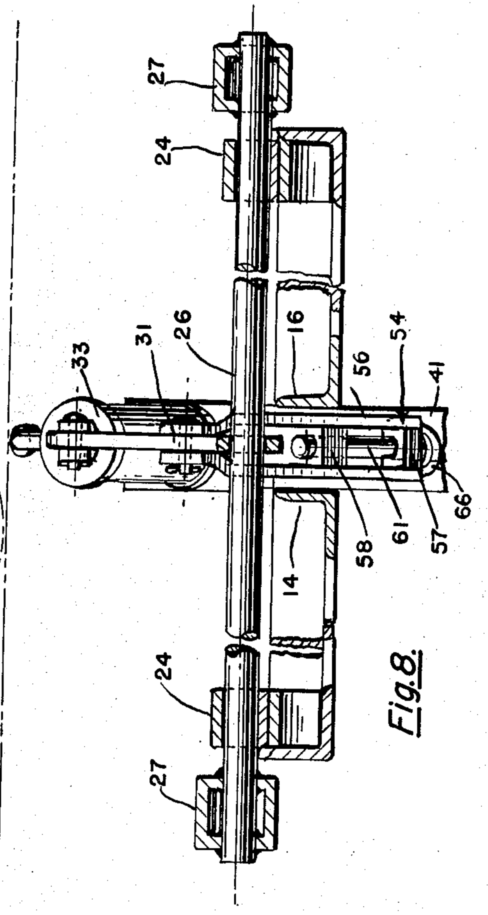
Fig. 8 is a cross sectional view on an enlarged scale taken substantially on line 8—8 of Fig. 2.
Figure 9:
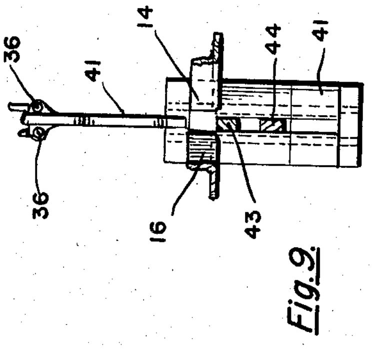
Fig. 9 is a cross sectional view on an enlarged scale taken substantially on line 9—9 of Fig. 2.
Figures 3, 4:
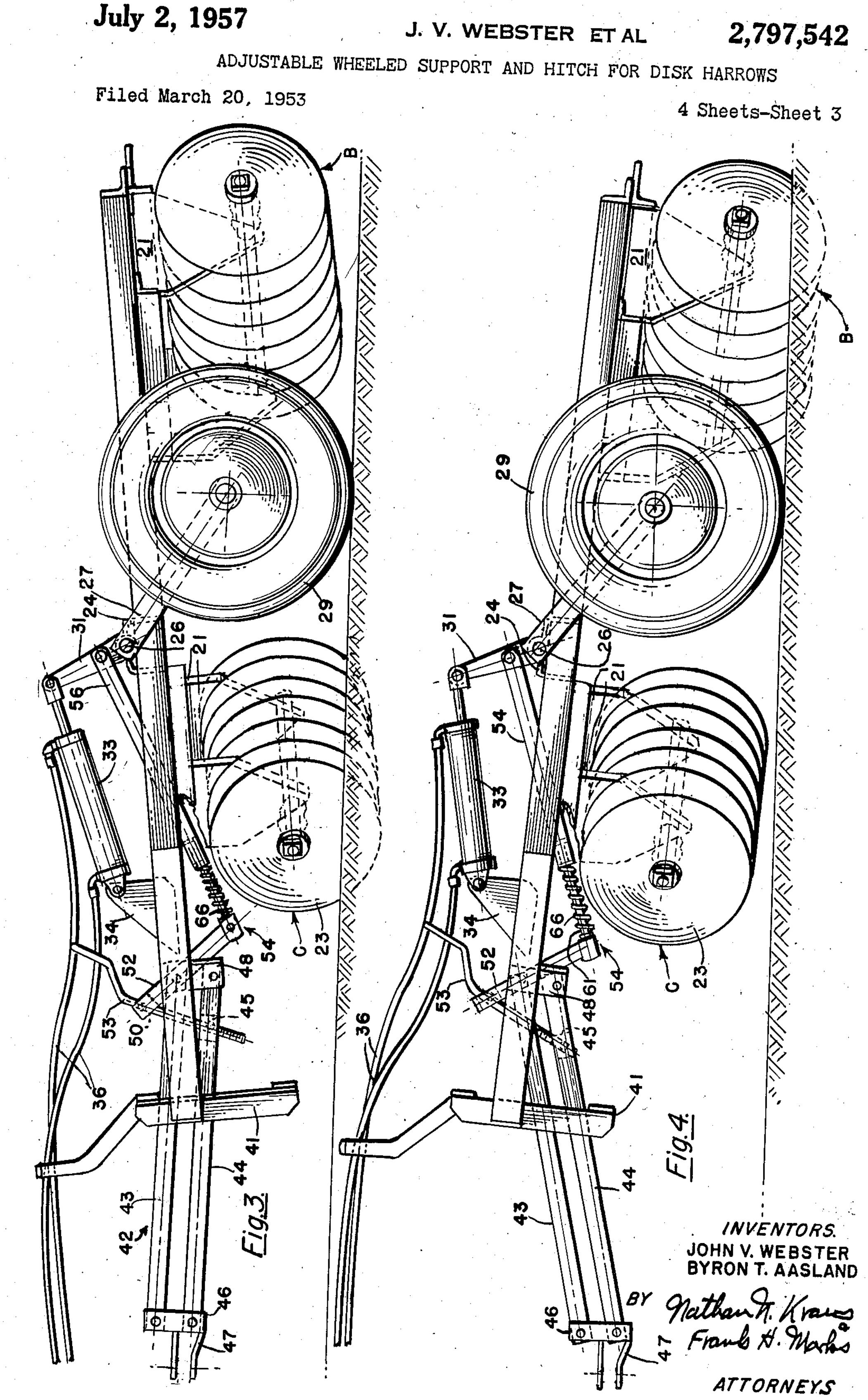
Figs. 3 and 4 are elevational views similar to Fig. 2 showing the disk gangs in different operative positions.

One of the important features of our invention is the provision of means whereby the disk harrow frame may be tilted forwardly or rearwardly, as illustrated in Figs. 3 and 4 so that the disk gangs may be selectively adjusted for desired penetration. It is of course understood that the disk harrow frame may also be adjusted for level operation so that the forward and rearward disk gangs are arranged for equal penetration into the ground. A telescoping link 54 is pivotally connected at its ends to the lever 31 and to the lever 52 and accordingly it will be seen that movement of either of the levers 31 and 52 will effect corresponding movement of the oppositely connected lever. The telescoping link 54 is formed of a pair of parallel bar members 56 having welded thereto a plurality of transverse angle elements 57, 58 and 59 to provide a rigid structure. As will be seen in Figs. 5 and 6 transverse elements 57 and 59 are welded to the ends of the members 56 and a similar element 58 is spaced from element 57. The elements 57 and 58 are provided with registering openings to slidably receive a bar 61 pierced at one end to receive a stop pin 62, said bar having welded to the opposite end a fork 63 which is also pierced to receive a pin 64 serving to pivotally connect the bar 61 to the lever 52. A coiled compression spring 66 is interposed between the fork 63 and element 57 with the bar 61 passing through said spring. The function of link 54 is to provide for over-travel of the lever 31, a condition which occurs only when the piston rod 32 of the hydraulic cylinder 33 is completely retracted as in Fig. 2 and when the disk gangs are on hard ground and the disks cannot penetrate into the ground to the adjusted depth. In such a condition the spring 66 affords a yielding connection between link 54 and lever 52 and protects the hitch members 42, 47 and related parts against injury. Obviously in such a condition the transport wheels 29 will be elevated off the ground by a distance equal to that which the disk gangs would penetrate into the ground if the ground were soft.

The operation of our improved disk harrow should be apparent from the foregoing description but briefly stated it is as follows:

The hitch or draft connection 42 may be adjusted vertically to accommodate the hitch clevis 47 to the draw bar of a tractor, thereby avoiding any manual lifting on the part of the operator to effect a connection of the hitch clevis to the tractor draw bar. Upon rotation of the crank 53 in one direction or the other, the parallel members 43 and 44 will be caused to move from the solid line position to the broken line position as illustrated in Fig. 2 or to any intermediate position thereof independently of the harrow frame. After connection has been effected the harrow may be adjusted to operate with the forward and rearward disk gangs arranged for equal penetration, as in Fig. 2, or for unequal penetration as illustrated in Figs. 3 and 4. Since the position of the hitch clevis 47 is fixed as a result of it being connected to the draw bar of a tractor and since the lever 31 attached to the shaft 26 carrying the transport wheels is in a fixed position as of the time of the adjustment, it will be apparent that any manipulation of the crank 53 will serve only to change the relationship between the parallel members 43 and 44 and the frame as illustrated in Figs. 2, 3 and 4. Thus, because the relative positions of the levers 31 and 52 are determined by the position of the wheels 29, the only part of the structure capable of movement is the frame which is caused to be rocked about the aixs of the wheels 29. By the foregoing means the frame may be adjusted to a horizontal position as in Fig. 2 where the forward and rearward disk gangs are arranged to penetrate equally to the same depth into the ground or the frame may be tilted either forwardly or rearwardly as illustrated in Figs. 3 and 4 so as to effect unequal penetration of the forward and rearward disk gangs.

Figures 5, 6:
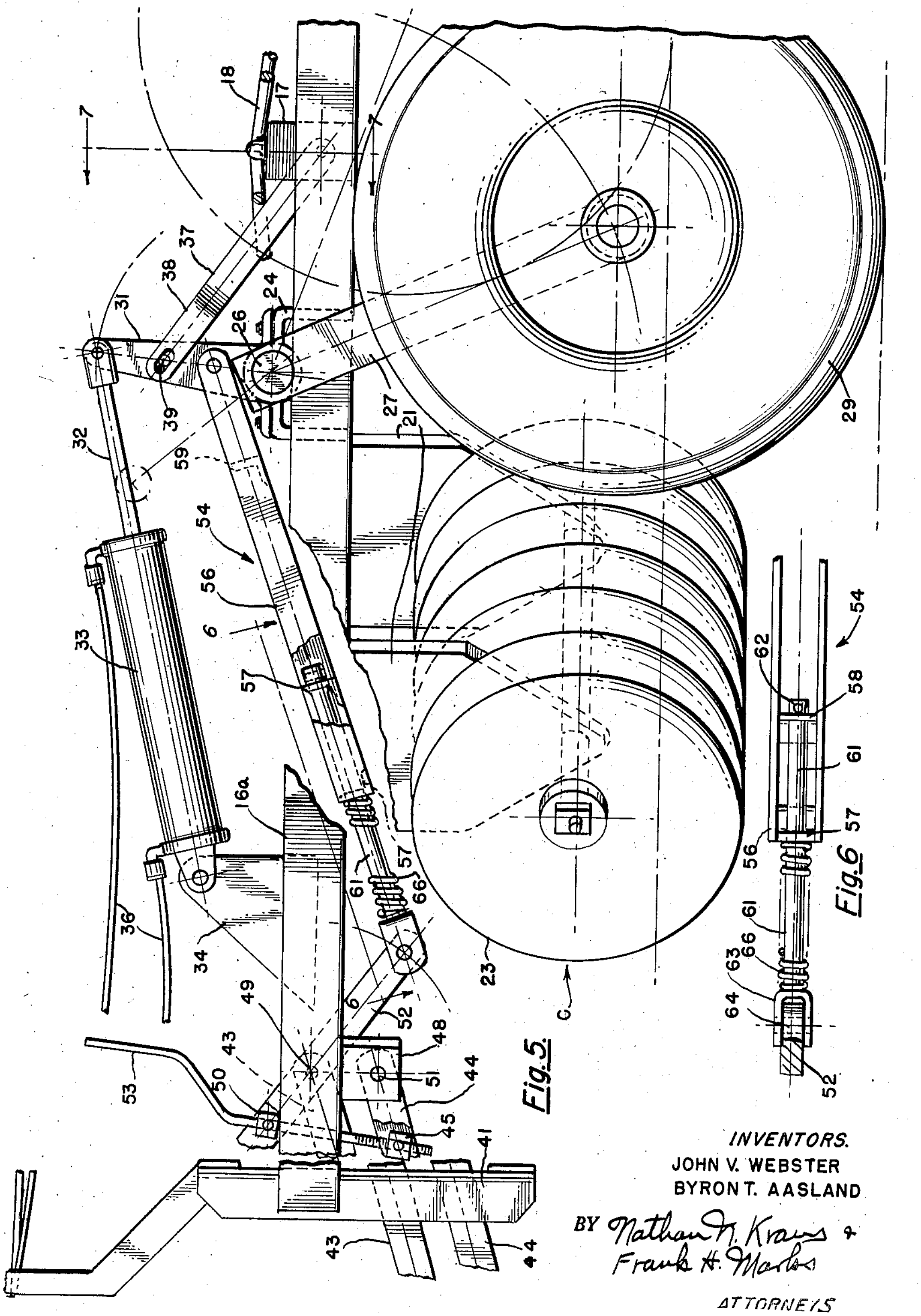
Fig. 5 is a fractional elevational view on an enlarged scale showing the parts in such relationship as to cause the disk gangs to be elevated above the ground whereby to impose the weight of the harrow on the ground wheels.
Fig. 6 is a cross sectional view on an enlarged scale taken substantially on line 6—6 of Fig. 5.

The positions of the wheels 29 which determine the operative and transport positions of the disk gangs are controlled by the tractor operator who manually manipulates a control valve associated with the hydraulic fluid pump of the tractor to control the flow of pressure fluid into the cylinder. In order to condition the disk harrow for transport the piston rod 32 of the jack cylinder 33 is caused to be moved outwardly to the limit of its stroke to the position illustrated in Fig. 5. During such movement the lever 31 is rocked clockwise about the axis of shaft 26 thereby rotating shaft 26 and correspondingly rocking crank arms 27 supporting the wheels 29. In transport position as illustrated in Fig. 5, it will be seen that the wheels 29 engage with the ground surface and that the disk gangs are elevated above the ground and out of engagement therewith. Reverse movement of the piston rod of the jack cylinder effects a counterclockwise rocking of the lever 31 about the axis of shaft 26 and also corresponding movement of crank arm 27 and wheels 29 so that the disk gangs are caused to descend into contact with the ground. The depth of penetration of the disk gangs is controlled by the assumed position of the wheels 29 which rest on the ground when the disk gangs penetrate thereinto. It will be understood that the positions of the wheels illustrated in Fig. 2 by the solid and broken lines illustrate maximum limits of movement and that the wheels may be adjusted to operate at any intermediate position between such limits.

Various changes coming within the spirit of our invention may suggest themselves to those skilled in the art. Hence we do not wish to be limited to the specific embodiments described or uses mentioned, but intend the same to be merely exemplary, the scope of our invention being limited only by the appended claims.

We claim:

1. In an agricultural machine of the character described, a frame, forward and rearward disk gangs supported from said frame, a shaft mounted for rotation on said frame, a first lever fixed on said shaft, a pair of crank arms fixed on said shaft, a wheel carried on each crank arm at each side of said frame, means for connecting the forward end of said frame directly to a tractor comprising a pair of vertically spaced parallel members connected at their rear ends to said frame by horizontal pivots and connected at their forward ends by horizontal pivots to a tractor hitching member, a pivoted lever supported intermediately thereof on a horizontal axis on said frame, a link member connected to said first lever and said pivoted lever, said link member including two elements in telescoping relation to each other to permit relative over-travel of parts connected to opposite ends of said link member, and spring means interposed between said elements and biasing the same outwardly relative to each other, screw means pivotally supported for rotation at an end portion of said pivoted lever and operatively engaged with said parallel members, said screw means being operative to move said parallel members vertically so as to vertically adjust said tractor hitching member for coupling to the drawbar of a tractor, a pressure fluid power device mounted on the frame and operatively connected with said first lever for moving said wheels from working position to transport position, said screw means when said tractor hitching member is coupled to a tractor being operative to adjust the position of said frame relative to a horizontal plane whereby to selectively elevate or lower either of said disk gangs relative to the other.

2. In an agricultural machine of the character described, a frame, disk gangs supported from said frame, a shaft having a pair of crank arms and mounted for rotation on said frame, a first lever fixed on said shaft, a wheel carried on each crank arm of said shaft at each side of the frame, a pair of vertically spaced parallel members connected at their rear ends to said frame by horizontal pivots and connected at their forward ends by horizontal pivots to a tractor hitching member, power-actuated means connected to said first lever for moving said disk gangs from working position to transport position, means for adjusting said parallel members to adjust the elevation of said tractor hitching member to permit coupling of the same to the drawbar of a tractor, a link member operatively connecting said means to said first lever, said link member including two elements in telescoping relation to each other to permit relative over-travel of parts connected to opposite ends of said link member, spring means interposed between said elements and biasing the same outwardly relative to each other, said adjusting means being operative when said hitching member is coupled to a tractor to tilt said frame about the axis of said wheels whereby to raise and lower the forward end of said frame and the disk gangs supported therefrom.

References Cited in the file of this patent

UNITED STATES PATENTS

| | | |
|---|---|---|
| 1,013,382 | East | Jan. 2, 1912 |
| 1,615,630 | Kaupke | Jan. 25, 1927 |
| 1,775,297 | Towner | Sept. 9, 1930 |
| 1,901,134 | Strandlund | Mar. 14, 1933 |
| 2,320,742 | Newkirk | June 1, 1943 |
| 2,458,091 | Moore | Jan. 4, 1949 |
| 2,635,519 | Cook | Apr. 21, 1953 |
| 2,717,479 | Scheidenhelm et al. | Sept. 13, 1955 |

FOREIGN PATENTS

| | | |
|---|---|---|
| 686,719 | France | Apr. 15, 1930 |